US006731726B1

(12) United States Patent
Kerner et al.

(10) Patent No.: US 6,731,726 B1
(45) Date of Patent: May 4, 2004

(54) COMMUNICATION ON HOLD

(75) Inventors: Yair Kerner, Kiryat-Ono (IL); Iddit Shalem, Natanya (IL); Sverrir Olafsson, Reykjavik (IS)

(73) Assignee: Conexant Systems, Inc., Newport Beach, CA (US)

(*) Notice: Subject to any disclaimer, the term of this patent is extended or adjusted under 35 U.S.C. 154(b) by 382 days.

(21) Appl. No.: 09/592,707

(22) Filed: Jun. 13, 2000

Related U.S. Application Data

(63) Continuation-in-part of application No. 09/557,233, filed on Apr. 24, 2000, which is a continuation-in-part of application No. 09/416,482, filed on Oct. 12, 1999, and a continuation-in-part of application No. 09/393,616, filed on Sep. 10, 1999, which is a continuation-in-part of application No. 09/394,018, filed on Sep. 10, 1999, which is a continuation-in-part of application No. 09/361,842, filed on Jul. 27, 1999.
(60) Provisional application No. 60/128,874, filed on Apr. 12, 1999, and provisional application No. 60/167,572, filed on Nov. 26, 1999.

(51) Int. Cl.[7] .............................................. H04M 11/00
(52) U.S. Cl. ................................ 379/93.35; 379/215.01
(58) Field of Search .......................... 379/93.01, 93.05, 379/93.31–93.35, 142.07, 142.08, 142.15, 215.01; 375/222, 220; 370/252

(56) References Cited

U.S. PATENT DOCUMENTS

| 4,578,796 A | 3/1986 | Charalambous et al. .... 375/222 |
| 4,621,366 A | 11/1986 | Cain et al. ................... 375/222 |
| 4,852,151 A | 7/1989 | Dittakavi et al. ........ 379/93.35 |

(List continued on next page.)

FOREIGN PATENT DOCUMENTS

| EP | 0 409 641 A2 | 1/1991 |
| EP | 0 409 641 A3 | 1/1991 |
| EP | 0 601 260 B1 | 6/1994 |
| EP | 0 711 060 A1 | 5/1996 |
| EP | 0711060 A | 5/1996 |
| EP | 0 409 641 B1 | 6/1996 |
| EP | 0 741 418 A2 | 11/1996 |
| EP | 0 741 481 A2 | 11/1996 |
| EP | 0 812 096 A2 | 12/1997 |
| EP | 0 812 096 A3 | 12/1999 |
| FR | 741481 A2 * | 11/1996 | .......... H04M/11/06 |
| FR | 2 771 577 | 5/1999 |
| FR | WO 99 27702 A | 6/1999 |
| WO | WO 96/05684 A | 2/1996 |
| WO | WO 97/49228 | 12/1997 |
| WO | Wo 99/27702 | 6/1999 |
| WO | WO 99/31813 | 6/1999 |
| WO | WO 99 48304 A | 9/1999 |

OTHER PUBLICATIONS

"V.90" Sep. 1998 , ITU–T Telecommunication Standardization Sector of ITU, the whole document.
Multitech "V.92 Q&A", Internet, Online, Sep. 5, 2000. Retrieved from the Internet: <URL:HTTP://WWW/.MULTICH.COM/APPLICATIONS/DATA_FAX/V92.ASP>.

*Primary Examiner*—George Eng
(74) *Attorney, Agent, or Firm*—Farjami & Farjami LLP

(57) ABSTRACT

A communication session is established between an APCM modem and a DPCM modem. The central office interrupts the communication session by transmitting a call-waiting alert signal to the APCM modem. In response to the alert signal, the APCM modem transmits a caller ID data request to the central office. The APCM modem further transmits an on hold notification to the DPCM modem to prevent the DPCM modem from terminating the communication session as a result of the interruption by the alert signal and/or receipt of the caller ID data by the APCM modem. The DPCM modem is placed on hold while the APCM modem answers the call waiting. Subsequently, the APCM modem initiates a quick connect procedure to re-establish the communication session with the DPCM modem.

27 Claims, 11 Drawing Sheets

U.S. PATENT DOCUMENTS

| | | | |
|---|---|---|---|
| 4,894,847 A | 1/1990 | Tjahjadi et al. | 375/377 |
| 5,127,051 A | 6/1992 | Chan et al. | 375/222 |
| 5,131,025 A | 7/1992 | Hamasaki | 379/93.02 |
| 5,287,401 A | 2/1994 | Lin | 379/93.35 |
| 5,317,594 A | 5/1994 | Goldstein | 375/222 |
| 5,367,563 A | 11/1994 | Sainton | 379/93.29 |
| 5,463,661 A * | 10/1995 | Moran et al. | 375/222 |
| 5,513,251 A | 4/1996 | Rochkind et al. | 379/93.35 |
| 5,519,767 A | 5/1996 | O'Horo et al. | 379/67.1 |
| 5,550,908 A * | 8/1996 | Cai et al. | 379/215.01 |
| 5,600,712 A | 2/1997 | Hanson et al. | 379/142.06 |
| 5,651,060 A | 7/1997 | Cohn et al. | 379/93.35 |
| 5,668,861 A | 9/1997 | Watts | 379/201 |
| 5,684,825 A | 11/1997 | Ko | 375/222 |
| 5,729,594 A | 3/1998 | Klingman | 379/93.12 |
| 5,757,890 A | 5/1998 | Venkatakrishnan | 379/93.13 |
| 5,764,278 A | 6/1998 | Nagao | 348/14.1 |
| 5,764,736 A | 6/1998 | Shachar et al. | 379/93.09 |
| 5,796,808 A | 8/1998 | Scott et al. | 379/93.31 |
| 5,802,153 A | 9/1998 | Sridhar et al. | 375/220 |
| 5,862,474 A | 1/1999 | Kimball | 375/222 |
| 5,896,444 A | 4/1999 | Perlman et al. | 379/93.35 |
| 5,903,602 A | 5/1999 | Torkkel | 375/222 |
| 5,940,489 A | 8/1999 | Cohn et al. | 379/93.35 |
| 6,104,800 A | 8/2000 | Benson | 379/215.01 |
| 6,345,071 B1 | 2/2002 | Hamdi | 375/222 |
| 6,430,219 B1 | 8/2002 | Zuranski et al. | 375/231 |
| 6,452,963 B1 * | 9/2002 | Lee | 375/222 |
| 6,496,572 B1 * | 12/2002 | Liang et al. | 379/93.35 |
| 6,574,239 B1 | 6/2003 | Dowling et al. | 310/469 |

* cited by examiner

COMMUNICATION ON HOLD

RELATED APPLICATIONS

The present application is a Continuation-In-Part of U.S. application Ser. No. 09/557,233, filed Apr. 24, 2000, which is a Continuation-In-Part of U.S. application Ser. Nos. 09/416,482 and 09/393,616, filed Oct. 12, 1999 and Sep. 10, 1999, respectively, which are both Continuation-In-Part applications of U.S. application Ser. No. 09/394,018, filed Sep. 10, 1999, which is a Continuation-in application of U.S. application Ser. No. 09/361,842, filed Jul. 27, 1999, which claims the benefit of U.S. provisional application Ser. No. 60/128,874, filed Apr. 12, 1999. The present application also claims the benefit of U.S. provisional applications Ser. No. 60/167,572, filed Nov. 26, 1999. All above-mentioned applications are hereby fully incorporated by reference in the present application.

BACKGROUND OF THE INVENTION

1. Field of the Invention

The present invention relates generally to communication systems. More particularly, the present invention relates to placing communications on hold.

2. Background

The widespread use of the Internet as a daily research, entertainment, and communication tool has increased the deployment of modems and other communication devices. Many homes and offices use their existing telephone lines to access the Internet via modems. The existing lines, however, may support some subscriber-selected features, such as a call-waiting feature, which may interrupt a modem connection.

To prevent such interruptions, many existing communication softwares provide an option to the user to disable the call-waiting feature when the telephone line is in use by the modem. For example, at the time of installation, the communication software may prompt the user as to whether the intended telephone line supports the call-waiting feature. If the question is answered in the positive, the communication software may inquire as to whether the user wishes to disable the call-waiting feature. In response, almost all users wish to disable this feature, since the call-waiting signal may cause an interruption in the communication channel that may lead to a loss of connection. To disable the call-waiting feature, for example, the communication software may dial "*70" immediately before dialing into the network. As a result, subsequent callers attempting to reach the user would receive a busy signal, since the call-waiting feature has been disabled for that telephone line.

It is extremely undesirable for many users to disable the call-waiting feature, since that may result in losing important telephone calls. There is, therefore, a need for modems or other communication devices that are able to support the call-waiting feature reliably and without causing premature disconnects of the communication session.

One recurring problem area in implementing a reliable method of handling call-waiting interruptions, however, is a loss of carrier by the remote modem or communication device during the call-waiting interruption by the central office. During the period when the central office generates a call-waiting alert signal on the line to inform the user that an incoming call is being received and optionally transmits caller ID data, the remote modem receives silence. This silence may be misinterpreted by the remote modem as a loss of carrier.

As a result, the remote modem will initiate a recovery process to regain the lost carrier. Based on modem standards for Hayes compatible modems, carrier must be lost for the time indicated by the S-register "10" value before the remote modem may disconnect. The default value for the S-register "10" is "14" which is in 0.1-second units, i.e. 1.4 seconds. Therefore, if the remote modem does not recover the carrier within 1.4 seconds, the communication session is terminated by the remote modem. Very often, however, the silence period caused by the call-waiting interruptions may last much longer than 1.4 seconds. As a result a call-waiting interruption would cause the remote modem to terminate the communication session.

One simple approach to this problem may be to change the default value of the S-register "10" for the remote modem to require a longer period for loss of carrier before the call is terminated. For example, the S-register "10" value may be changed to "140" which means that the remote modem would have to confirm the loss of carrier for 14 seconds before terminating the communication session. However, this solution is too simplistic and undesirable for the Internet service providers and the like, since a loss of carrier may result from a variety of reasons. Therefore, extending the S-register "10" value is not a panacea and has serious adverse effects, such as preventing the Internet service providers from terminating the communication session on time and making their lines available to other users, when the carrier is truly lost for many other reasons. Of course, an even simpler approach would be the conventional approach of disabling the call-waiting feature.

All such approaches, however, fail to remedy this serious problem reliably and without introducing other serious and undesirable affects. Accordingly, there is an intense need in the art for a modem or communication device that can place the remote communication device on hold reliably and in time to prevent the remote modem from misinterpreting the silence period as a loss of carrier and terminating the communication session as a result.

SUMMARY OF THE INVENTION

In accordance with the purpose of the present invention as broadly described herein, there is provided method and system for placing a communication on hold.

According to one embodiment of the present invention, a communication session is established between two modems, for example, an APCM modem and a DPCM modem. The central office interrupts the communication session by transmitting a call-waiting alert signal to the APCM modem. In response to the alert signal, the APCM modem transmits a caller ID data request to the central office. The APCM modem further transmits an on hold notification to the DPCM modem to prevent the DPCM modem from terminating the communication session as a result of the interruption by the alert signal and/or receipt of the caller ID data by the APCM modem.

In another aspect of the present invention, the DPCM modem replies to the modem on hold notification with a hold response, including a parameter indicating a maximum hold period. In other aspects, the DPCM modem may reply with a disconnect response indicating that the communication should be terminated if the APCM modem wishes to answer the call waiting, and then waiting for a response from the APCM modem whether the communication should be resumed or terminated.

In one aspect of the present invention, the APCM modem may transmit the hold notification prior to receiving the caller ID data from the central office. Yet, in another aspect of the invention, the hold notification transmission may overlap with the receipt of the caller ID data from the central office.

In another aspect of the present invention, the DPCM modem may receive an interruption. In yet another aspect, the interruption may occur during a negotiation phase between the APCM and DPCM modems. In other embodiments, the interruption may occur during a data phase. In some embodiments, the interruption may be transmitted by the APCM or DPCM modem.

These and other aspects of the present invention will become apparent with further reference to the drawings and specification, which follow.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present invention may be described herein in terms of functional block components and various processing steps. It should be appreciated that such functional blocks may be realized by any number of hardware components and/or software components configured to perform the specified functions. For example, the present invention may employ various integrated circuit components, e.g., memory elements, digital signal processing elements, logic elements, look-up tables, and the like, which may carry out a variety of functions under the control of one or more microprocessors or other control devices. In addition, those skilled in the art will appreciate that the present invention may be practiced in any number of data communication contexts and that the modem system described herein is merely one illustrative application for the invention. Further, it should be noted that the present invention may employ any number of conventional techniques for data transmission, signaling, signal processing and conditioning, and the like. Such general techniques that may be known to those skilled in the art are not described in detail herein.

It should be appreciated that the particular implementations shown and described herein are merely exemplary and are not intended to limit the scope of the present invention in any way. Indeed, for the sake of brevity, conventional encoding and decoding, caller ID detection or processing, tone detection or transmission, training, and other functional aspects of the data communication system (and components of the individual operating components of the system) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system.

Figure 1:
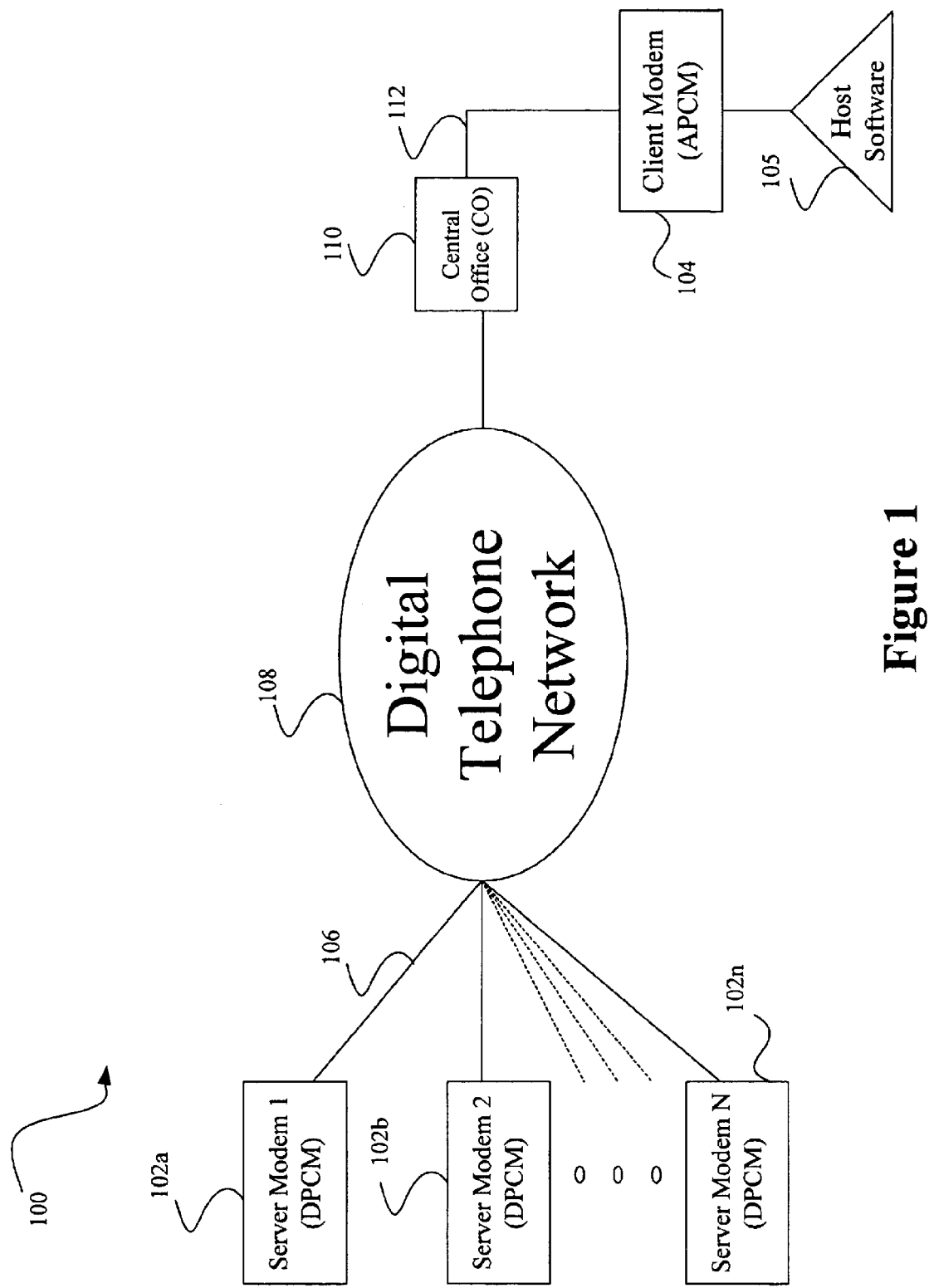
FIG. 1 is a block diagram depicting a general modem system environment capable of supporting point-to-point protocol ("PPP")connections.

Turning to the drawings, FIG. 1 illustrates a block diagram depicting a general modem system 100 in which the techniques of the present invention may be practiced. Modem system 100 may be capable of supporting connections associated with an upper layer protocol, e.g., point-to-point protocol ("PPP") connections. PPP connections are typically associated with Internet communications between, e.g., an individual end user and an Internet service provider. In this respect, modem system 100 includes a plurality of server modems (identified by reference numbers 102a, 102b, and 102n) and a client modem 104. Server modems 102 may each be associated with an Internet service provider or any suitable data source. Client modem 104 may be associated with a suitable data source, e.g., a personal computer capable of running host software 105. For purposes of this description, host software 105 may be an operating system such as MICROSOFT WINDOWS, or any application program capable of functioning in conjunction with modem system 100. Although not shown in FIG. 1, client modem 104 may be integrated with the personal computer.

In the context of this description, modem system 100 may employ 56 kbps modem devices that are compatible with the V.92 Recommendation, the V.90 Recommendation, legacy 56 kbps protocols, the V.34 Recommendation, or the like. Such modem devices are suitable for use in modem system 100 where a given server modem 102 utilizes a digital connection 106 to the digital telephone network 108. The client modem 104 is connected to a local central office 20 via an analog local loop 22. Thus, the communication channel established between client modem 104 and any server modem 102 is digital up to the central office 20. Thereafter, the digital signals are converted to an analog signal for transmission over the local loop 22.

If an end user desires to establish an Internet connection, host software 105 may perform any number of operations in response to a user command. For example, host software 105 may prompt client modem 104 to dial the telephone number associated with server modem 102a (which, for this example, is the server modem associated with the user's Internet service provider). Server modem 102a and client modem 104 perform a handshaking routine that initializes the equalizers, echo cancelers, transmit power levels, data rate, and possibly other operational parameters associated with the current communication channel.

Figure 2:
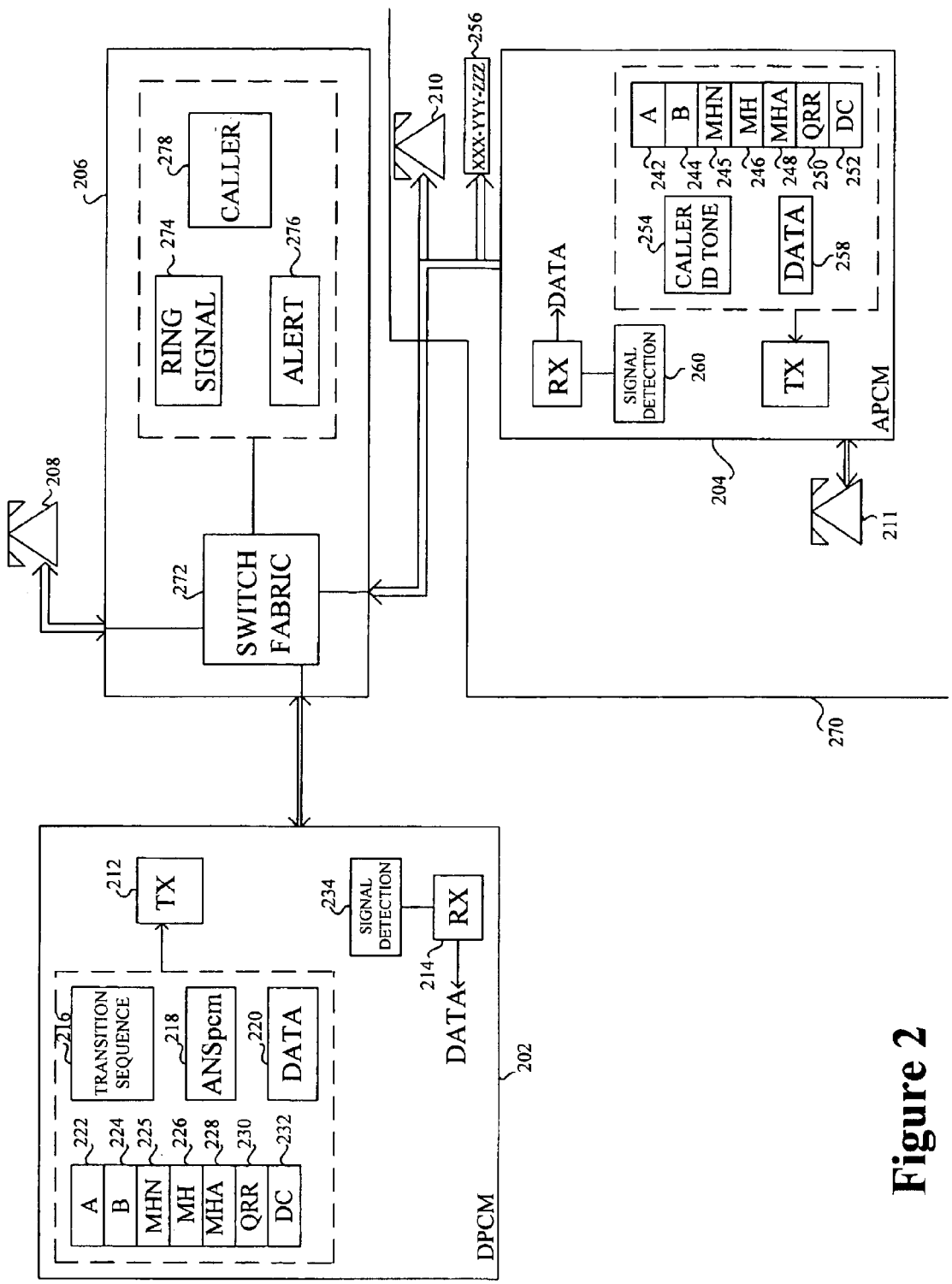
FIG. 2 is a block diagram of a modem system environment in which various aspects of the present invention may be incorporated.

FIG. 2 is a schematic representation of an exemplary environment in which a modem system 200 may operate. Modem system 200 generally includes a first modem device 202, which may be associated with a central site, and a second modem device 204, which may be resident at a customer site 270. In the context of a typical V.92 or V.90 system, first modem device 202 may be the DPCM and second modem device 204 may be the APCM. The DPCM modem 202 is coupled to a central office 206 via a digital link and the APCM modem 204 is coupled to central office 206 via an analog link, e.g., the local loop. It should be appreciated that modem system 200 may include additional elements and functionality associated with the quick startup routine and/or the quick reconnect procedure described in the above-incorporated related applications.

FIG. 2 also depicts a calling device 208 (which is capable of placing an incoming call to the customer site), a parallel answer device 210 located at the customer site, and a series answer device 211 located at the customer site. As shown in FIG. 2, the parallel answer device 210 is connected such that it receives the same calls as the APCM modem 204 in a concurrent manner. In contrast, the series answer device 211 is connected such that the APCM modem 204 routes calls to it. The APCM modem 204 may control or regulate the call traffic to and from series answer device 211 in a conventional manner. A call may be established between the calling device 208 and the answer devices 210 and 211 via the central office 206, and a modem connection may be established between the DPCM modem 202 and the APCM modem 204 via the central office 206.

For the sake of clarity and brevity, FIG. 2 depicts the APCM modem 204 and the DPCM modem 202 in a manner that relates to the example processes described herein. In practical embodiments, each of the modem devices 202 or 204 may be capable of functioning as a transmit or receive modem, and each of the modem devices 202 or 204 may be capable of originating the various signals described herein.

The DPCM modem 202 includes a transmitter section 212 and a receiver section 214, both of which may be configured in accordance with conventional technologies. The DPCM modem 202 is capable of transmitting a number of signals, sequences and tones during various modes of operation. The DPCM modem 202 may be configured to transmit a suitable transition sequence 216 and a characteristic signal point sequence (such as the ANSpcm signal 218) associated with a quick startup routine or a quick reconnect procedure, as described in the above-incorporated related applications. During the data mode, the DPCM modem 202 transmits data 220 in accordance with a suitable data transmission scheme.

The DPCM modem 202 is also capable of transmitting a number of signals that may be received by the APCM modem 204 and/or by the central office 206. For example, the DPCM modem 202 is capable of transmitting an "A" tone 222 and a "B" tone 224 as described herein. In one embodiment, the "A" tone 222 is a 2400 Hz tone and the "B" tone 224 is a 1200 Hz tone (as set forth in 1TU-T Recommendation V.34). Of course, the modem devices 202 or 204 may generate and process any suitable tones or signals in lieu of (or in addition to) these predefined tones. The DPCM modem 202 is also configured to transmit a number of additional signals associated with the notification of a modem-on-hold, the initiating of a modem-on-hold mode, the reconnection of a modem session after a holding period, and the clearing down of a modem connection, as further described below. For example, the DPCM modem 202 may be capable of transmitting a modem hold notification 225, a modem hold request 226, a modem hold acknowledgment 228, a quick reconnect request 230 and a disconnect signal 232 (referred to herein as "modem status signals"). The format and function of these signals are described in more detail below.

The DPCM modem 202 may also include a signal detection element 234, which may employ any number of known techniques to detect, analyze, and interpret control signals, requests, and tones transmitted by the APCM modem 204 and/or by the central office 206. For example, signal detection element 234 may utilize a conventional tone detector and/or a conventional V.34, V.90 or V.92 differential phase-shift keying (DPSK) receiver configured to detect and distinguish the different signals described herein.

For purposes of the signaling scheme described herein, the APCM modem 204 is preferably configured in a manner similar to the DPCM modem 202. In other words, the APCM modem 204 is capable of transmitting an "A" tone 242, a "B" tone 244, a modem hold notification 245, a modem hold request 246, a modem hold acknowledgment 248, a quick reconnect request 250 and a disconnect signal 252. In addition, the APCM modem 204 may be configured to generate a caller ID tone 254 that informs central office 206 that the customer site supports a caller ID feature (as depicted by the caller ID component 256). In accordance with current standards, caller ID tone 254 is a DTMF "D" tone having a length of approximately 55–65 milliseconds. Of course, the APCM modem 204 transmits data 258 during the data mode.

As described above in connection with the DPCM modem 202, the APCM modem 204 preferably includes a signaling detection element 260 that enables APCM 204 to receive, detect, and analyze the various signaling tones and sequences transmitted by the DPCM modem 202. In this manner, both the APCM modem 204 and the DPCM modem 202 are capable of receiving the signals and are capable of switching operating modes in response to the particular signal or signals that are received.

The central office 206 is configured in a conventional manner to perform circuit switching associated with modem, voice, and facsimile calls. The central office 206 may support any number of customer sites and the central office 206 may be operatively coupled to any number of other central offices, central site modems, or the like. As described briefly above, the APCM modem 204, answer device 210, and caller ID component 256 may reside at customer site 270.

The central office 206 includes a suitable switching fabric 272 for routing calls between the appropriate parties. For example, the switching fabric 272 may switch to a first state to establish a modem connection between the DPCM modem 202 and the APCM modem 204 and to a second state to establish a voice connection between calling device 208 and answer device 210. Furthermore, switch fabric 272 may be capable of temporarily interrupting a connection to impress control signals, data, or tones onto the current circuit or line. In this respect, central office 206 may transmit a number of ring signals 274, alert signals 276, caller ID data 278, and other information depending upon the particular situation. For example, in accordance with current methodologies, central office 206 may temporarily interrupt a voice call and transmit a call-waiting alert signal 276 to the customer site 270. If the customer accepts the incoming call, then switch fabric 272 may be reconfigured to route the incoming call the customer site 270 while the original call is placed on hold.

As mentioned previously, the signaling scheme preferably employs Phase 2 signaling tones that are also used by conventional V.34, V.90 or V.92 modem systems. In addition, the signaling scheme uses DPSK transmission techniques, which allows the signaling to integrate in a seamless manner with V.34, V.90 and V.92 retraining procedures. The signals are configured such that they can be detected by either a V.34/V.90/V.92 DPSK receiver or by a relatively simple tone detector. In one practical embodiment, modem hold notifications, modem hold requests, modem hold acknowledgments, quick reconnect requests, and disconnect signals are preceded by a period (e.g., at least 50 milliseconds) of either tone "A" or tone "B". This technique leverages the use of the A and B tones, which are employed by conventional V.34, V.90 and V.92 modem systems, and takes advantage of the modulation scheme that is already in use by the modem system. Thus, because DPCM 202 will typically be conditioned to receive DPSK signals, the signaling mechanism is easy to implement.

The modem status signals that follow the "A" or "B" tones may be transmitted as DPSK signals based on a repeated bit pattern. In one embodiment, a modem status signal is a DPSK signal associated with eight repetitions of a four-bit pattern, where different patterns correspond to different modem status signals. The use of a four-bit pattern is desirable to enable the use of a simple tone detector for signaling detection elements 234 and 260; shorter bit patterns result in a fewer number of frequency components associated with the DPSK signal. Consequently, the signal detection scheme need not employ a complex processing routine that analyzes a large number of frequencies for spectral content. Illustrative bit patterns for the different modem status signals are set forth in Table 1 below.

TABLE 1

Modem Status Signals

| Modem Status Signal | Signal Abbreviation | DPSK Pattern |
|---|---|---|
| Disconnect Signal | DC | 0101 |
| Modem Hold Notification | MHN | 0010 |
| Modem Hold Request | MH | 0011 |
| Modem Hold Acknowledge | MHA | 0001 |
| Quick Reconnect Request | QRR | 0111 |

The particular bit patterns are preferably selected such that the resultant DPSK signal is distinguishable over DPSK signals that are "reserved" for use in the context of other data communication protocols. For example, a DPSK pattern of all zeros is equivalent to the "A" or "B" tones, and a DPSK pattern of all ones is equivalent to the V.34 INFOMARK signal. In addition, the particular bit patterns may be suitably selected such that the resultant DPSK signal is easy to detect by a tone detector. For the example bit patterns set forth in Table 1, the modem status signals will have the frequency content listed in Tables 2 and 3 below, where the frequencies are in Hertz, an "X" indicates spectral content greater than a threshold level, and a dash "–" indicates spectral content that is lower than the threshold level. For the example DPSK bit patterns shown in Table 1, a lower spectral energy component is at least 8 dB down from a higher spectral energy component at the same frequency. Consequently, the different modem status signals can be distinguished notwithstanding the existence of some shared frequency components.

TABLE 2

Frequency Components for Modem Status Signals (APCM)

| | 900 | 975 | 1050 | 1125 | 1200 | 1275 | 1350 | 1425 | 1500 |
|---|---|---|---|---|---|---|---|---|---|
| DC | | | X | | | | X | | |
| MHN | | | | | | X | | X | |
| MH | X | | X | | X | | X | | X |
| MHA | | | — | X | | X | | — | |
| QRR | | X | | — | | | | — | X |

TABLE 3

Frequency Components for Modem Status Signals (DPCM)

| | 2100 | 2175 | 2250 | 2325 | 2400 | 2475 | 2550 | 2625 | 2700 |
|---|---|---|---|---|---|---|---|---|---|
| DC | | | X | | | | X | | |
| MHN | | | | | | X | | X | |
| MH | X | | X | | X | | X | | X |
| MHA | | | — | X | | X | | — | |
| QRR | | X | | — | | | | — | X |

The different frequency ranges employed by the APCM and DPCM are related to an exemplary application where different carriers are used by the two modem devices. For example, in a conventional V.90 or V.92 system, the DPCM uses signaling near 2400 Hz (tone "B" and the DPSK carrier), while the APCM uses signaling near 1200 Hz. This feature was derived from the conventional V.34 scheme where the calling modem uses signaling near 1200 Hz and the answer modem uses signaling near 2400 Hz. Consequently, the two spectral patterns are the same but for the shift between 1200 Hz and 2400 Hz. This methodology ensures that the end devices can properly detect the signals even where both ends are transmitting the same type of signal.

In one embodiment, the modem status signal detection need not detect the entire "spectral fingerprint" for the given signals. Rather, signal detection elements 234 and 260 may be configured to detect and analyze a distinctive number of the spectral components for purposes of indicating a match. For example, as shown in Tables 2 and 3, if a signal contains relatively high spectral energy at 1050 Hz and 1350 Hz, then the signal may be a disconnect signal or a modem hold request. Accordingly, the signal detection routine will continue to analyze the signal for spectral content at 900 Hz, 1200 Hz, and/or 1500 Hz and make the appropriate decision.

Figure 3:
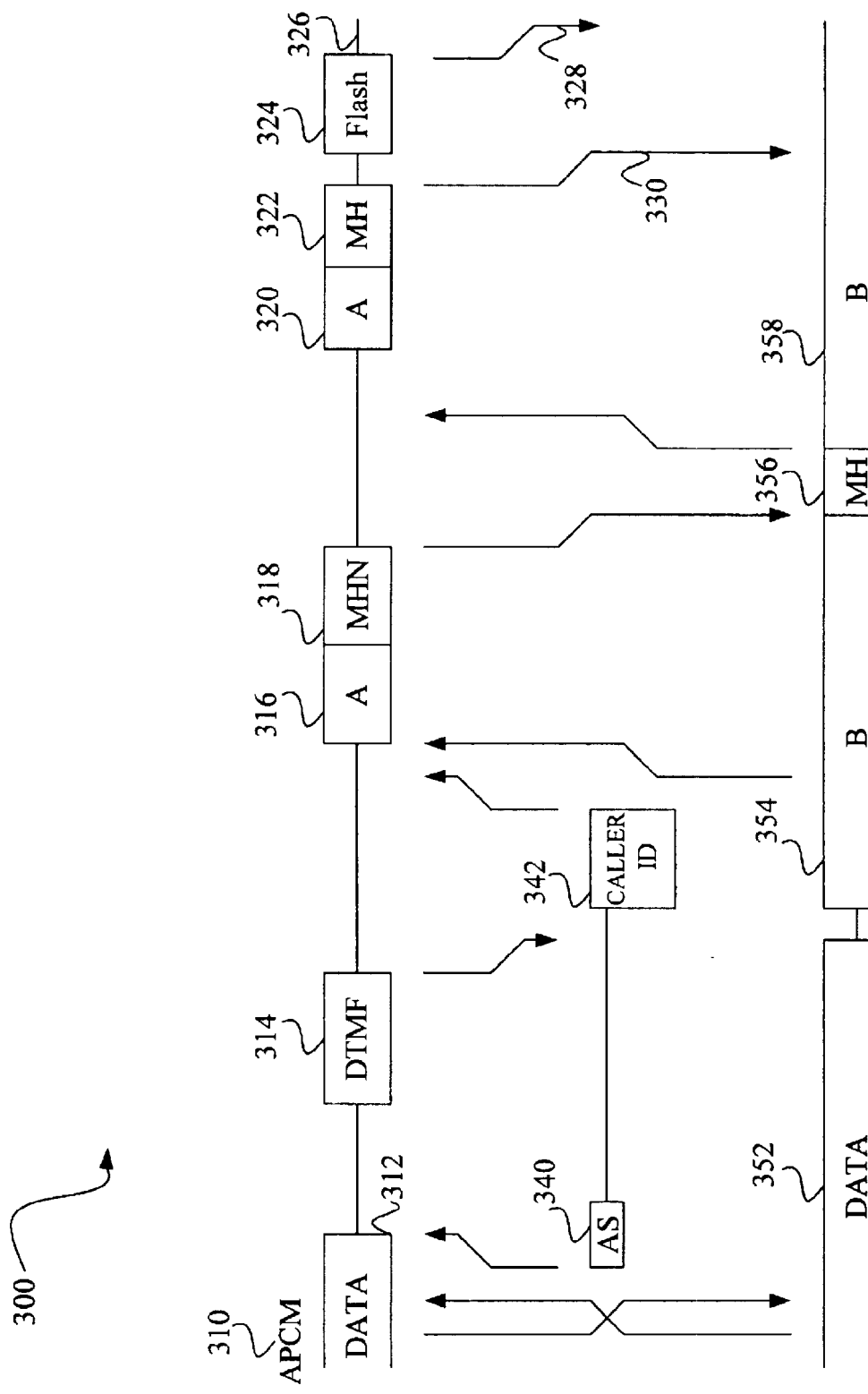
FIG. 3 is a timing diagram for placing a remote modem on hold in a modem-on-hold transaction according to one embodiment of the present invention.

FIG. 3 illustrates a timing diagram of a connection, between an APCM modem 310 and a DPCM modem 350, that is interrupted by a call-waiting indication and where the modem connection is placed on hold while the incoming call is answered by the APCM modem 310 end. FIG. 3 is applicable regardless of whether customer site 270 employs parallel answer device 210 or series answer device 211. The progression of signals, sequences, tones, commands, and the like are shown with respect to the APCM modem 310, the DPCM modem 350, and a central office (not shown). The central office may be associated with signals to the APCM modem 310 and signals to the DPCM modem 350.

During the data mode, the central office temporarily interrupts the modem connection and sends an alert signal ("AS") 340 to the APCM modem 310. The alert signal 340 may be a conventional call-waiting alert and it may include a component that is audible to humans (e.g., an audio tone) and a component that is detectable by data communication devices or machines. In accordance with most call-waiting protocols, the alert signal 340 components are transmitted in series. In response to the alert signal 340, the APCM modem 310 may send a DTMF tone 314 to request caller ID data from the central office. As described above, the DTMF tone 314 may be a short burst of a DTMF "D" tone having a duration of about 55–65 milliseconds. Assuming that the central office receives and recognizes the DTMF tone 314, the central office will format and transmit the caller ID data 342 to the APCM modem 310. As shown in FIG. 2, the caller ID data 342 (represented by reference No. 278 in FIG. 2) may be received and processed in a suitable manner for display or analysis by a caller ID component 256.

In response to the switching out of the APCM modem 310 by the central office, the DPCM modem 350 starts transmitting an appropriate signal, e.g., a "B" tone 354. In one embodiment, the "B" tone 354 may be transmitted while the caller ID data 342 is being transmitted by the central office. The "B" tone 354 is continuously transmitted while the DPCM modem 350 waits for the APCM modem 310 to reply with an "A" tone 316.

During the period in which the central office interrupts the communication between the APCM modem 310 and the DPCM modem 350 by sending the alert signal 340 and the caller ID data 342 to the APCM modem 310, the DPCM modem starts receiving a silence. The silence may be misinterpreted by the DPCM modem 350 as a loss of carrier. Conventionally, in response to the loss of carrier, the DPCM modem 350 starts a loss of carrier timer that is initialized by a user programmable value, e.g. S-register "10" value. The default value of the S-register "10" is in 0.1 seconds and typically set to "14", i.e., 1.4 seconds. If the loss of carrier timer expires (after 1.4 seconds), the DPCM modem 350 terminates the communication session.

Therefore, to prevent a misinterpretation of the silence period as a carrier loss by the DPCM modem 350, which would result in a loss of connection, the APCM modem transmits a modem hold notification 318 to the DPCM modem 350 prior to expiration of the loss of carrier timer. As shown, the modem hold notification 318 is preceded by a period of the "A" tone 316 transmission to the DPCM modem 350. The APCM modem 310 may transmit the "A" tone 316 if it receives the "B" tone 354 from the DPCM modem 318. As mentioned above, the "A" tone 316 is preferably transmitted for at least a minimum duration, e.g., 50 milliseconds, to give the DPCM modem 350 an opportunity to receive the "A" tone 350. If the DPCM modem 350 does not receive the "A" tone 316 within a specific time period, then it may eventually disconnect itself.

Once the DPCM modem 350 receives the modem hold notification 318 from the APCM modem 310, the DPCM modem 350 transmits a modem hold 356 to the APCM modem 310, informing the APCM modem 310 that the DPCM modem 350 is willing to be placed on hold while the APCM modem switched to the incoming call. In some embodiments, the modem hold 356 may include a parameter indicating the amount of time the DPCM modem 350 may be placed on hold before disconnecting.

Assuming that the user of the APCM modem 310 desires to answer the incoming call, then a modem hold 322 is transmitted following an "A" tone 320. The modem hold 322 may be prompted automatically by a suitable device resident at the customer site 270 or it may be prompted in response to a user command. The modem hold 322, which may be formatted as described above, is preferably transmitted for at least a minimum period of time. In one embodiment, the modem hold 322 is transmitted for approximately 53 milliseconds (all of the modem status signals described herein may have a similar minimum duration).

In one embodiment, in response to the modem hold 322, the DPCM modem 350 may transmit a modem hold acknowledgment (not shown) for a minimum period of time, e.g., approximately 53 milliseconds.

After the DPCM modem 350 transmits the modem hold 356 (or alternatively the modem hold acknowledgment (not shown)), the DPCM modem 350 preferably continues to transmit a "B" tone 358 while maintaining a hold state. In response to the modem hold acknowledgment (not shown) or after a predetermined period of time, the APCM modem 310 may generate a suitable flash signal 324 to instruct the central office to switch out the modem connection and to switch in the incoming call.

Turning back to FIG. 2, in addition, the handset (or other suitable answer device) begins to receive the incoming call; the APCM modem 204 may be configured to route the incoming signal to parallel answer device 210 or serial answer device 211 in an appropriate manner. In addition, the APCM modem 204 may be placed in an idle or "on-hook" state while the handset is connected. Accordingly, the user at customer site 270 may proceed with the incoming call while the DPCM modem 202 remains on hold. The modem connection may be reestablished by way of a quick modem reconnect procedure, as described in the above-incorporated related applications.

Figure 4:
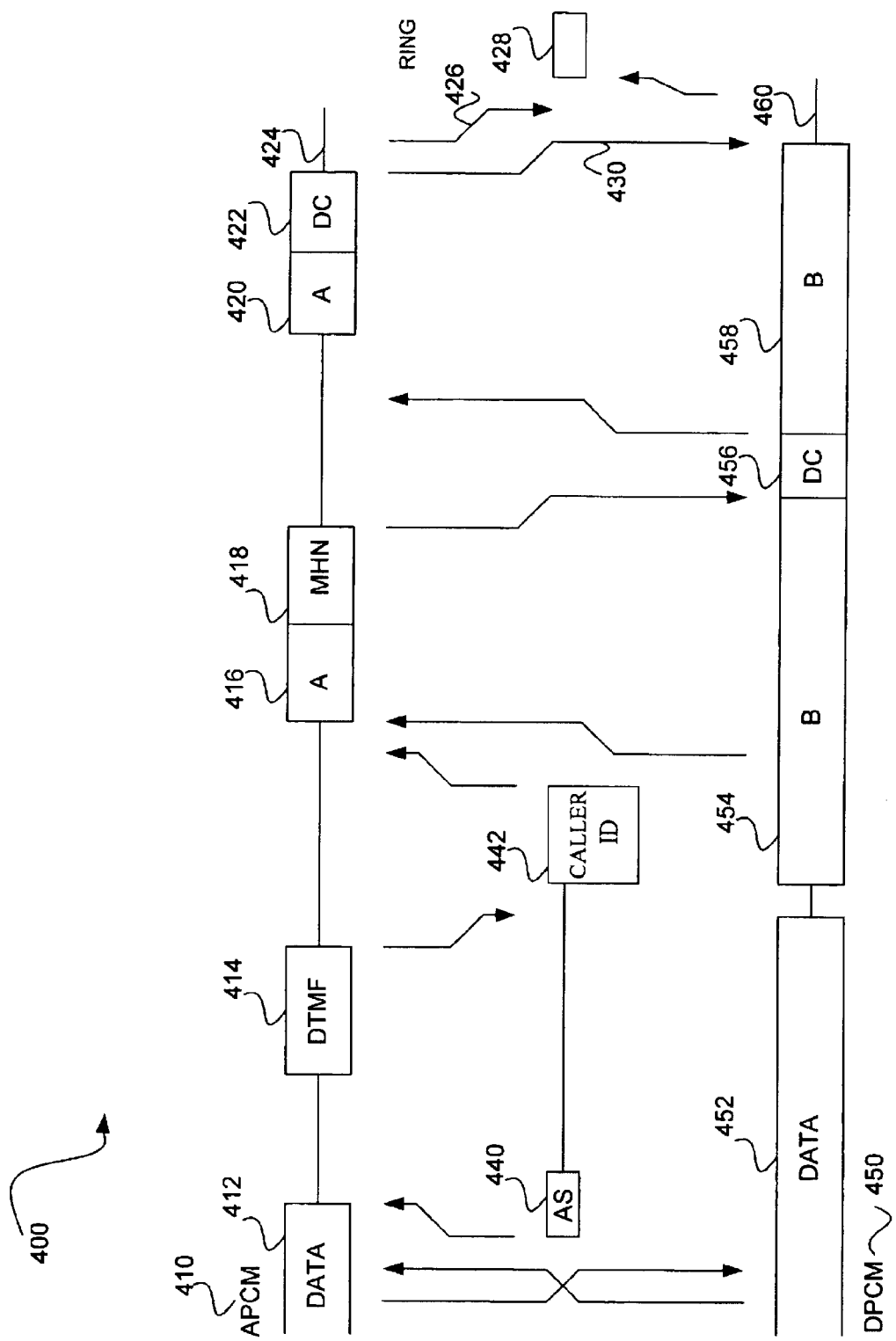
FIG. 4 is a timing diagram for disconnecting a remote modem in a modem-on-hold transaction according to one embodiment of the present invention.

Referring to FIG. 4, it shows a timing diagram of a communication session, between an APCM modem 410 and a DPCM modem 450, that is interrupted by a call-waiting indication and where the modem connection is disconnected before the incoming call is answered by the APCM modem 410 end. As shown, up to the point where a modem hold notification 418 is transmitted from the APCM modem 410 to the DPCM modem 450, the process is similar to that described above in connection with FIG. 3. However, in contrast to the FIG. 3 scenario where the DPCM modem 350 replied to the modem hold notification 318 with the modem hold 356, the situation depicted in FIG. 4 shows a transmission of a disconnect signal 456 from the DPCM modem 450. By transmitting the disconnect signal 456, the DPCM modem 450 informs the APCM modem 410 that the DPCM modem 450 would disconnect if the APCM modem 410 decided to answer the incoming call. After transmitting the disconnect signal 456, the DPCM modem 450 continues with a transmission of a "B" tone 458 while waiting for a response from the APCM modem 410.

At this juncture, the APCM modem would have to make a decision as to whether to ignore the incoming call and maintain the modem connection or to answer the incoming call and lose the present modem connection. FIG. 4 illustrates the APCM modem's 410 decision to answer the incoming call. In such case, after receipt of the DPCM modem's 450 preference to disconnect (if the APCM modem 410 were to answer the incoming call), the APCM modem 410 transmits an "A" tone 420 followed by a disconnect signal 422. The disconnect signal 422 informs the DPCM modem 450 of the APCM modem's 410 decision to terminate the communication session. The decision to terminate the communication session by the APCM modem 410 may be made automatically by the host software 105 (see FIG. 1) or by a user in response by a query made by the host software 105.

In one embodiment, after the DPCM modem 450 transmits the disconnect signal 456, the DPCM modem 450 idles or waits without transmitting any meaningful signals. In response to the disconnect signal 456, the APCM modem 410 clears down the modem connection in an appropriate manner, without transmitting the "A" tone 420 and the disconnect signal 422 sequence. If the central office does not detect any activity from the APCM modem 410 after a suitable timeout period, e.g., 1550 milliseconds, then the central office may assume that the APCM modem 410 has been disconnected. Thereafter, the central office switches out the DPCM modem 450 and generates ring signals 428 to customer site such that the incoming call may be answered. The DPCM modem 450 may also clear down its modem connection after a suitable timeout period, e.g., two seconds, during which it receives no signals from the APCM modem 410. Accordingly, the DPCM modem 450 will typically hang up once the central office begins generating the ring signals 428. Of course, as described in the above-incorporated related applications, prior to clear down, the APCM modem 410 and/or the DPCM modem 450 may save any number of relevant operational parameters to facilitate a quick connect for subsequent connections.

Figure 5:
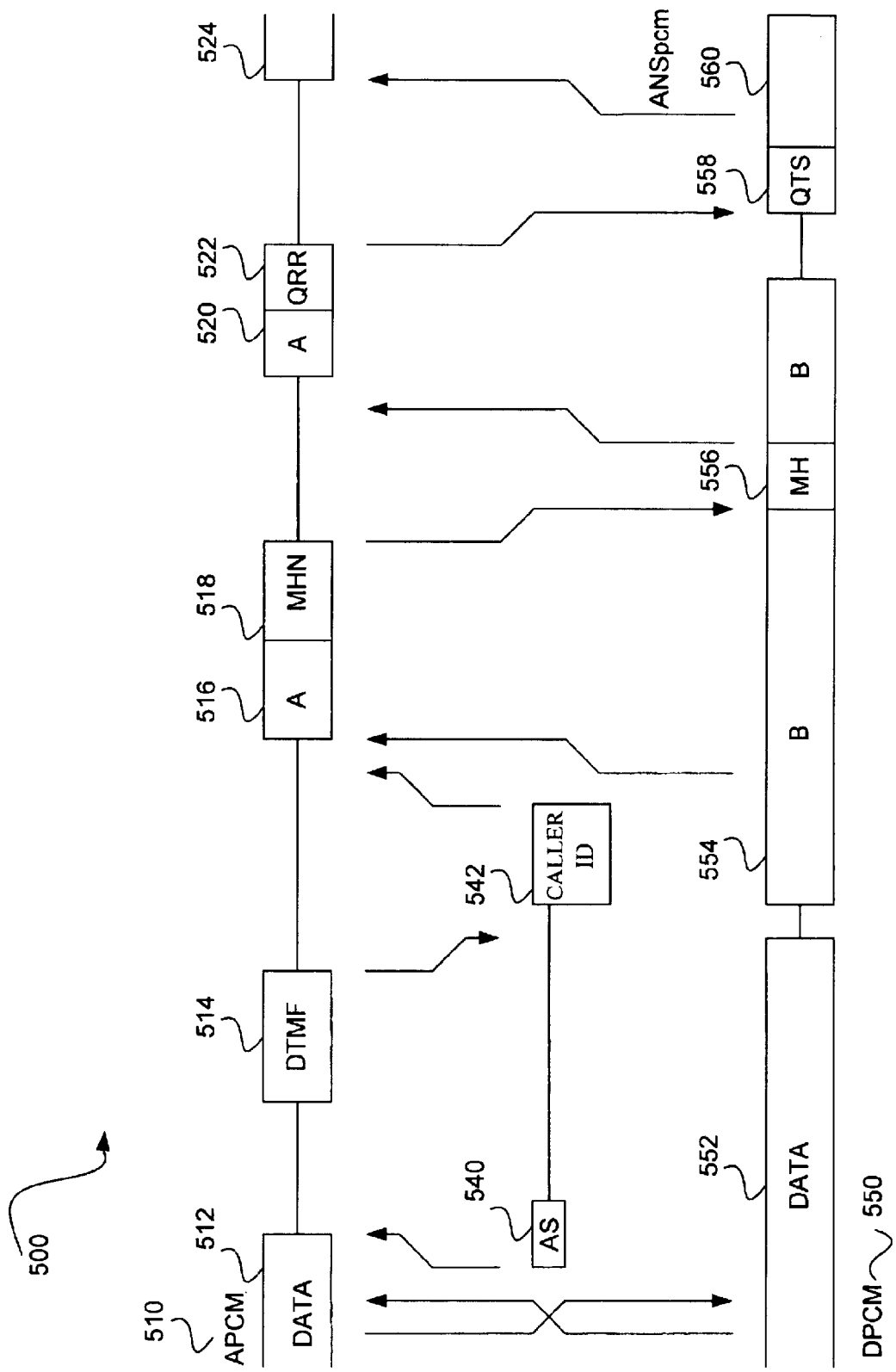
FIG. 5 is a timing diagram for reconnecting to a remote modem in a modem-on-hold transaction according to one embodiment of the present invention.

FIG. 5 shows a timing diagram of a communication session, between an APCM modem 510 and a DPCM modem 550, that is interrupted by a call-waiting indication and where the modem connection is revived via a quick reconnect request ("QRR")by the APCM modem 510 end. As shown, up to the point where a modem hold notification 518 is transmitted from the APCM modem 510 to the DPCM modem 550, the process is similar to that described above in connection with FIG. 3. However, in contrast to the FIG. 3 scenario where the APCM modem 310 replied to the modem hold 356 from the DPCM modem 350 with the modem hold 322, the situation depicted in FIG. 5 shows a transmission of a quick reconnect request signal 522 preceded by an "A" tone 520 to the DPCM modem 550. By transmitting the quick reconnect request signal 522, the APCM modem 510 informs the DPCM modem 550 that the APCM modem 510 wishes to maintain the communication session and ignore the incoming call. Such a situation may occur when the quality of the modem connection is important, when the end user does not want to be disturbed by incoming calls, and/or if the modem connection is severely affected by the alert signal 540. Furthermore, such a situation may occur in response to the caller ID data 542, i.e., the answering party may choose to ignore incoming calls from certain calling parties.

In response to the quick reconnect request signal 522, the DPCM modem 550 may transmit a QTS signal 558 followed by an ANSpcm signal 560 to facilitate the quick reconnect routine, as described in the above-incorporated related applications. It should be noted that the APCM modem 510 may alternatively transmit a suitable modem status signal, e.g., a phase reversal, that indicates a full retrain procedure rather than a quick reconnect procedure. In such an embodiment, the retrain procedure would proceed in a conventional manner.

The signaling routines and procedures described above in connection with FIGS. 3–5 may be equivalently applied to accommodate various requests that originate at the customer site 270 (see FIG.2). For example, in FIG. 3, the user of the APCM modem 310 may desire to place a current modem connection on hold, to prompt a quick reconnect, or to prompt a full retrain in an independent manner. In one embodiment, the modem hold notification ("MHN") and the modem hold ("MH")signals may be incorporated into the conventional Phase 4 constellation parameter ("CP")and modulation parameter ("MP")sequences. Accordingly, if either modem device desires to place the other modem device on hold (e.g., for three-way calling), then the requesting modem device may perform a rate renegotiation and transmit the hold signal in an appropriate manner. This technique may be performed in a similar manner as the conventional V.34, V.90 and V.92 clear down procedure, where a special code (data rate=0) is used to indicate a clear down. However, the modem hold signaling technique may utilize a different bit combination or leverage a number of reserved bits. Accordingly, in such embodiments, the interruption (e.g., control signals, data, or tones) of the communication channel may be by one of the communication device and not from the central office. Furthermore, the interruption may occur during a negotiation phase between the communication devices or after the communication devices have entered the data phase.

In response to the APCM modem's 310 user request to place the connection on hold, the APCM modem 310 may generate an "A" tone followed by an appropriate modem status signal (e.g., a modem hold notification, a modem hold, a quick reconnect request, or the like) for receipt by the DPCM modem 350. As described above in connection with FIG. 3, the DPCM modem 350 may then respond with a "B" tone followed by an appropriate status signal reply (e.g., a modem hold, a QTS signal, or the like). In this manner, the techniques of the present invention can be applied in any number of situations unrelated to a call-waiting alert, a line interruption, or a line corrupting event.

Figure 6:
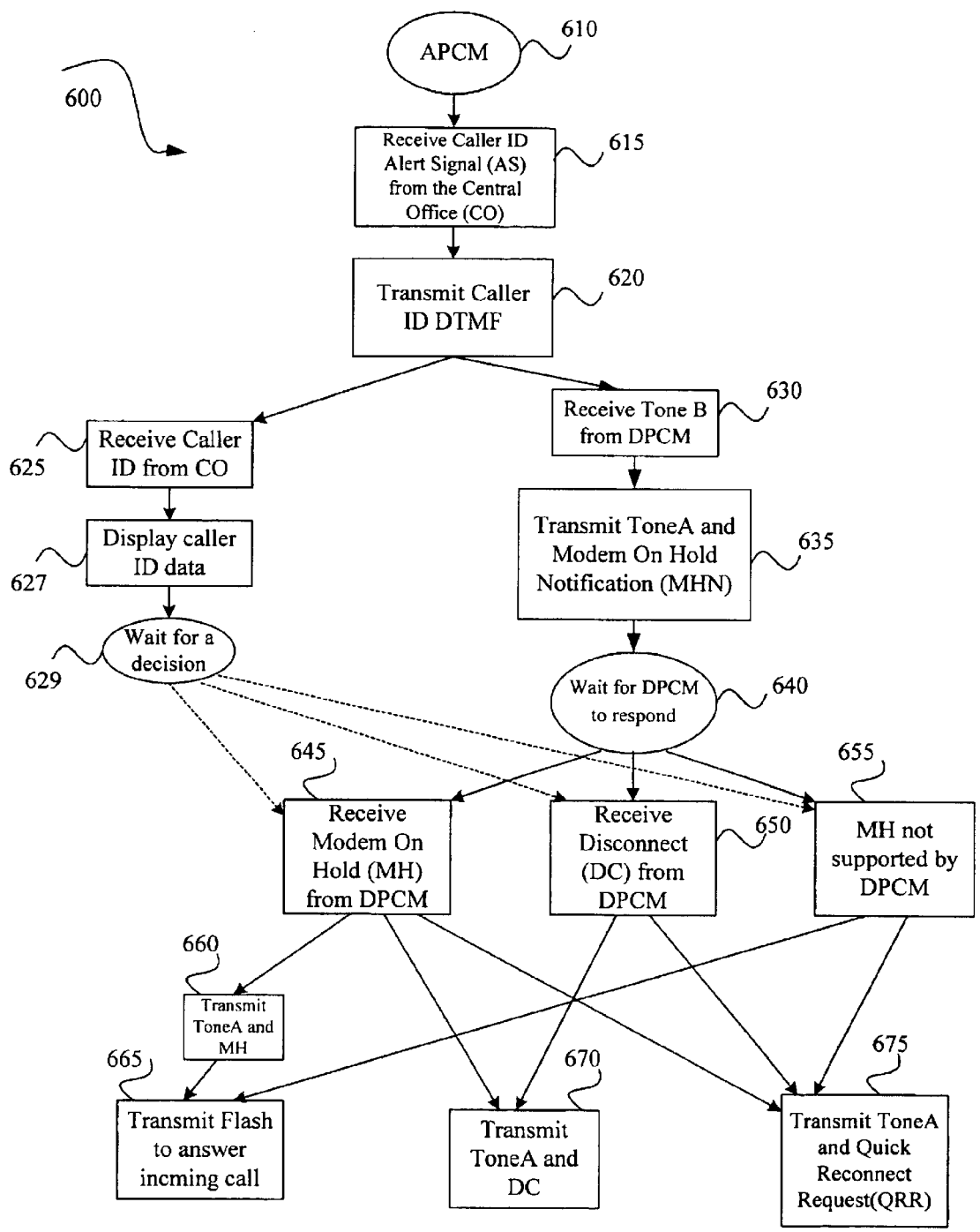
FIG. 6 is a flow diagram illustrating a modem-on-hold transaction according to one embodiment of the present invention.

Turning to FIG. 6, it illustrates an example flow diagram of the steps a client modem, e.g., an APCM modem, may take in response to receiving caller ID data from the central office while in communication with a DPCM modem. As shown in a communication on hold process 600, the ADPCM modem is continuously monitoring the line for an alert signal from the central office at step 610. Once the alert signal is detected, the process 600 transitions to alert signal step 615 where the alert signal is confirmed. After confirming the alert signal, the APCM modem moves to a DTMF step 620. At step 620, the APCM modem transmits a "D" tone, as explained above, to the central office requesting that the caller ID data be transmitted to the APCM modem. At this point, the APCM modem configures itself to receive the caller ID data. For example, the APCM modem receiver may be configured for V.21 operation for receiving the caller ID data. The APCM modem may further be configured to detect a "B" tone from the DPCM modem.

As shown in FIG. 6, after transmitting the "D" tone in step 620, the process 600 may start a multi-task operation where the process 600 concurrently monitors the line for both the caller ID data and the "B" tone from the DPCM modem in steps 625 and 630, respectively. Once the "B" tone is received, the process 600 transitions to step 630 where the "B" tone may be confirmed for a predetermined amount time, e.g., 10–20 milliseconds. At this point, to avoid a misinterpretation by the DPCM modem that a loss of carrier has occurred, the process 600 transitions to step 635 where the APCM modem transmits an "A" tone followed by a modem hold notification, as described above, to the DPCM modem. As a result of the multi-task operation of the process 600, in some embodiments, the transmission of the modem hold notification of step 635 may precede or overlap with the receipt of the caller ID data in step 625.

Now, the process 600 transitions to a wait state 640 where the APCM modem awaits a response from the DPCM modem. In the mean time, however, the APCM modem may be receiving the caller ID data from the central office. In one embodiment, the caller ID data, once received, may be formatted and displayed for use by a user at step 627.

Back to the wait state 640, the DPCM modem may respond to the APCM modem notification in two ways or may not respond at all if modem on hold feature is not supported by the DPCM modem, as shown in steps 645, 650 and 655, respectively. The DPCM modem may respond with a modem on hold ("MH")indication as shown in step 645, in which case, the process 600 may move to one of three steps 660, 670 or 675. The decision as to which step is selected may be made automatically by the APCM modem based on a predetermined setting. For example, the APCM modem or the host software may check the caller ID data against stored information. Yet, the decision may be made by the user at step 629 in response to the caller ID data displayed at step 627. In the first option, the process 600 may move to state 660 where the APCM modem requests the DPCM modem to hold. Next, the process 600 transitions to flash step 665 where a flash signal is used to cease the incoming call while the DPCM modem is placed on hold. In one embodiment, the step 660 may be skipped and the process 600 may move directly from the step 645 to the flash step 665. In another embodiment, the APCM modem may wait for a modem on hold acknowledgement after the step 660 and before moving to the flash state 665.

In the second option, however, the process 600 may transition to disconnect state 670 after receiving an MH indication from the DPCM modem. Similar to the first option, the second option may be determined automatically or by the user. As shown at the disconnect step, the process 600 transmits an "A" tone followed by a disconnect request ("DC")to the DPCM modem to terminate the communication session. As the third option, the process 600 may transition to a quick reconnect state 675, where the APCM modem ignores the incoming call and requests that the two modems reinstate their interrupted communication via a quick connect scheme described in the above-incorporated related applications. In some embodiments, the modems may retrain in a conventional manner.

Turning to the wait state 640, the DPCM modem may respond to the APCM modem notification with a disconnect ("DC")indication as shown in step 650. The receipt of DC by the APCM modem indicates that the DPCM modem would disconnect if the APCM modem wishes to answer the incoming call. At this step 650, the APCM modem has two options available, which options are shown in states 670 and 675. As stated above, the decision may be made automatically or by the user. At step 650, the user may also be informed of the DPCM modem's preference to disconnect, so the user may make a more informed decision. If a decision is made to answer the incoming call, the process 600 moves to state 670 to terminate the communication session, as described above. Alternatively, the process 600 may transition to the quick reconnect state 675 if a decision is made to ignore the incoming call and reinstate the connection.

As stated above, the DPCM modem may not respond to the APCM modem's modem on hold notification transmitted at step 635. In such case, the wait state 640 will eventually time out and the process 600 enters step 655. At step 655, the process 600 may inform the user of the status and request a response or may automatically decide whether to move to the flash state 665 or the quick reconnect state 675. If the flash state 665 is selected, the APCM modem ceases the incoming call and the DPCM modem will probably disconnect after a time out period. On the other hand, if the quick reconnect state 675 is entered, the APCM modem ignores the incoming call and the modems attempt to reconnect.

Figure 7:
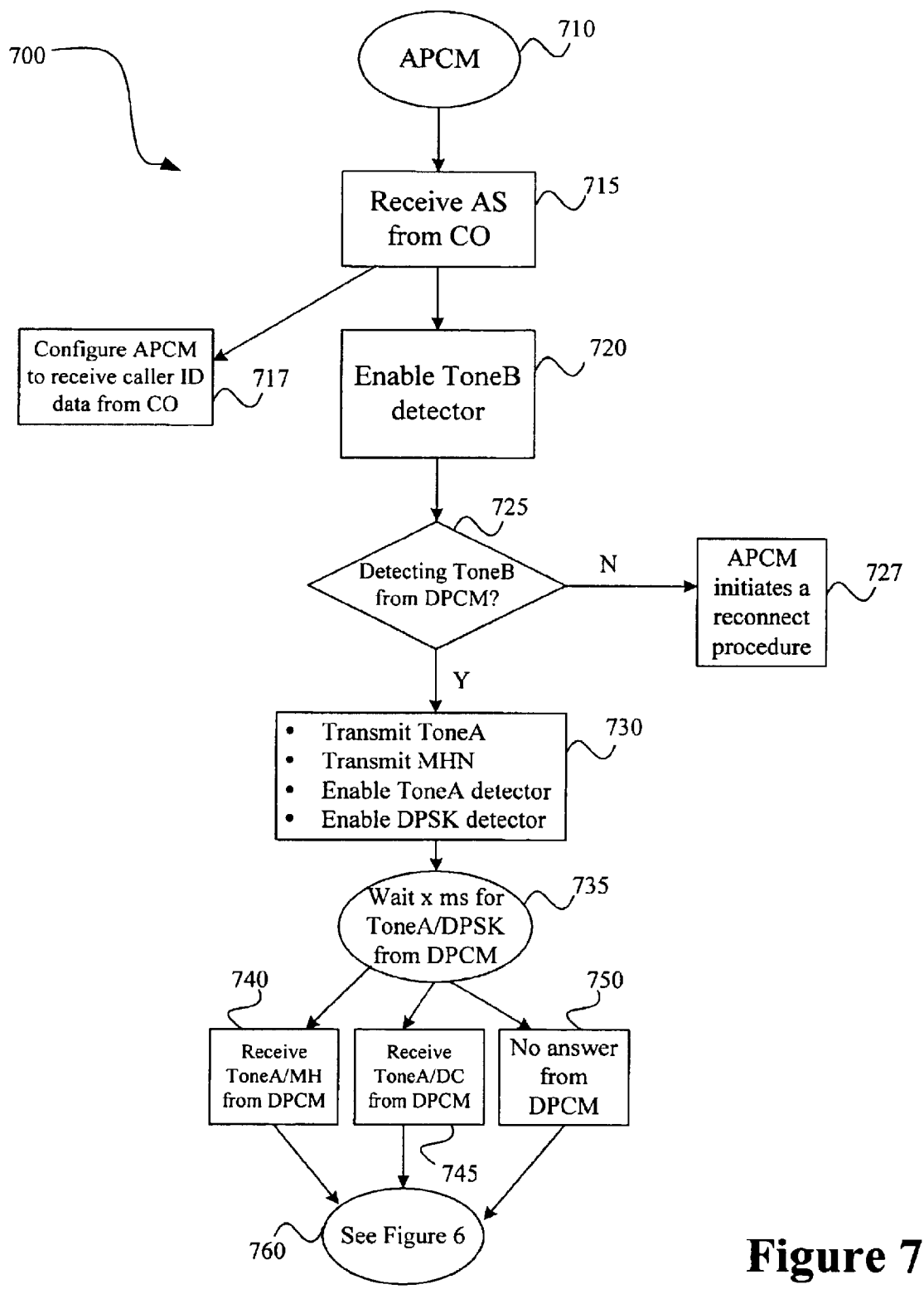
FIG. 7 is a flow diagram illustrating example steps taken by a requesting modem during a modem-on-hold transaction according to one embodiment of the present invention.

FIG. 7 illustrates an example flow diagram of some detailed steps taken by the APCM modem during a modem on hold transaction. As shown, APCM process 700 starts by receiving the alert signal from the central office at step 710 that causes the process 700 to enter the alert signal step 715. At the alert signal step 715, the alert signal is confirmed. At this point, in some embodiments, the APCM process 700 may enter a multi-tasking mode where the APCM process 700 monitors the communication line for caller ID data and a "B" tone from the DPCM modem concurrently. In other embodiments, the APCM process 700 may wait for the caller ID data first before starting to monitor the communication line for receiving the "B" tone from the DPCM modem.

Turning back to the APCM process 700, after the alert signal step 715, the APCM process 700 moves to the caller ID and the "B" tone states 717 and 720, respectively. In the caller ID state, the APCM process 700 configures the APCM receiver to receive the caller ID data. In the "B" tone state, the APCM process 700 enables the "B" tone detector and starts monitoring the communication line for the "B" tone in step 725. At step 725, if the "B" tone is not detected within a predetermined amount of time, e.g., 500–700 milliseconds, the APCM process 700 may move to a reconnect step 727 to revive the communication session. Alternatively, if the "B" tone is detected and confirmed for about 10–20 milliseconds, step 730 may be entered. At step 730, the APCM process starts transmitting an "A" tone for about 50 milliseconds followed by a modem on hold notification, as described above. Further, at step 730, the APCM process enables an "A" tone detector as well as DPSK detectors for detecting the DPCM modem response to the modem on hold notification. At this point, the APCM process 700 enters a wait state 735 where the APCM process 700 waits to receive an "A" tone for about 10–20 milliseconds from the DPCM modem followed by a DPSK response. Based on the DPSK response from the DPCM modem, the APCM process 700 may enter state 740, 745 or 750. These steps were described above in conjunction with FIG. 6.

Figure 8:
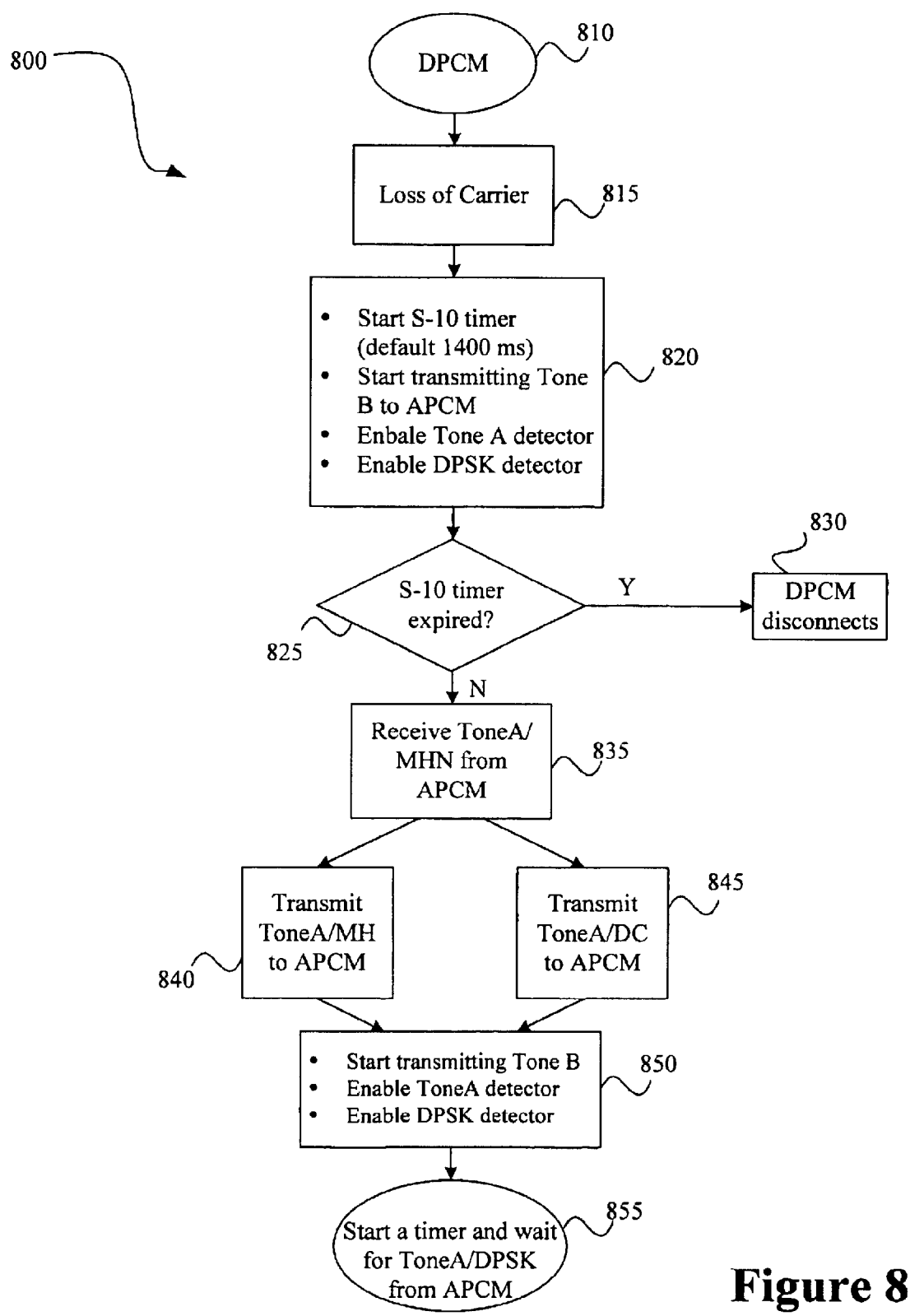
FIG. 8 is a flow diagram illustrating example steps taken by a remote modem during a modem-on-hold transaction according to one embodiment of the present invention.

FIG. 8 illustrates an example flow diagram of some detailed steps taken by the DPCM modem during a modem on hold transaction. As shown, the DPCM process first experiences a loss of carrier when the DPCM modem starts receiving a silence from the APCM modem while the APCM modem is interrupted by the central office transmission of the alert signal and the caller ID data. When the loss of carrier is detected, the DPCM process 800 moves to a loss of carrier state 815. At this state, the DPCM process 800 moves to step 820 and reads the contents of S-register "10" and starts a 0.1 second timer based on the S-register "10" value. As stated above, the default value for S-register "10" is "14". Accordingly, the DPCM modem is given 1.4 seconds to recover from the loss of carrier. Concurrently with starting the S-register timer, the DPCM process 800 starts a "B" tone generation, enables "A" tone detector and DPSK detector.

After configuring the DPCM modem in the step 820, the DPCM process 800 transitions to state 825 waiting to receive a modem on hold notification from the APCM modem. It is crucial that the DPCM process 800 receives the modem on hold notification before the S-register "10" time expires. Furthermore, it is of extreme importance that the modem on hold notification be transmitted by the APCM modem within about 1.4 seconds for several reasons. For example, for the Hayes compatible modems, the default value of the S-register "10" is "14" and this value remains unchanged for many installed modems. In addition, it is extremely undesirable to increase the value of the S-regisier "10" for the sole purpose of avoiding a disconnect in modem on hold situations, since S-register "10" value is a general purpose register and applicable to all cases of loss of carrier. Such extension of the S-register "10" value would cause the DPCM modem to wait more than necessary when the carrier is truly lost.

Turning back to FIG. 8, if the DPCM modem fails to receive an "A" tone from the APCM modem, the DPCM process 800 moves to a disconnect step 830 where the communication session is terminated. In some embodiments, the DPCM modem may enter a retrain step (not shown) instead of terminating the communication session. On the other hand, if the DCPM modem receives an "A" tone and a modem on hold notification from the APCM modem within the allotted time in S-register "10", the DPCM process 800 transitions to step 835. Once the modem on hold notification is received, the DPCM process 800 must determine as to whether to accept to be placed on hold by the APCM modem or advise the APCM modem that the DPCM modem wishes to terminate the session if the APCM modem were to continue with the modem on hold process. The DPCM modem may make this determination automatically based on some predetermined conditions or based on a user response. In any event, the DPCM process 800 may either transmit an "A" tone followed by a modem on hold DPSK signal, state 840, or an "A" tone followed by a disconnect DPSK signal, state 845, to the APCM modem. As a result, the DPCM process 800 informs the APCM process 700 whether the modem on hold process is granted or rejected. In some embodiments, at step 840, the DPCM process 800 may also transmit a parameter to the APCM modem indicating the amount of time the DPCM modem may be placed on hold.

After transmitting the DPCM process 800 response from either state 840 or state 845, the DPCM process 800 enters state 850 where the DPCM process 800 starts transmitting a "B" tone, enables an "A" tone detector and DPSK signals detector. The DPCM process 800 then moves to a wait state 855 where the DPCM process 800 awaits a response from the APCM modem as described in conjunction with FIG. 6.

Figure 9:
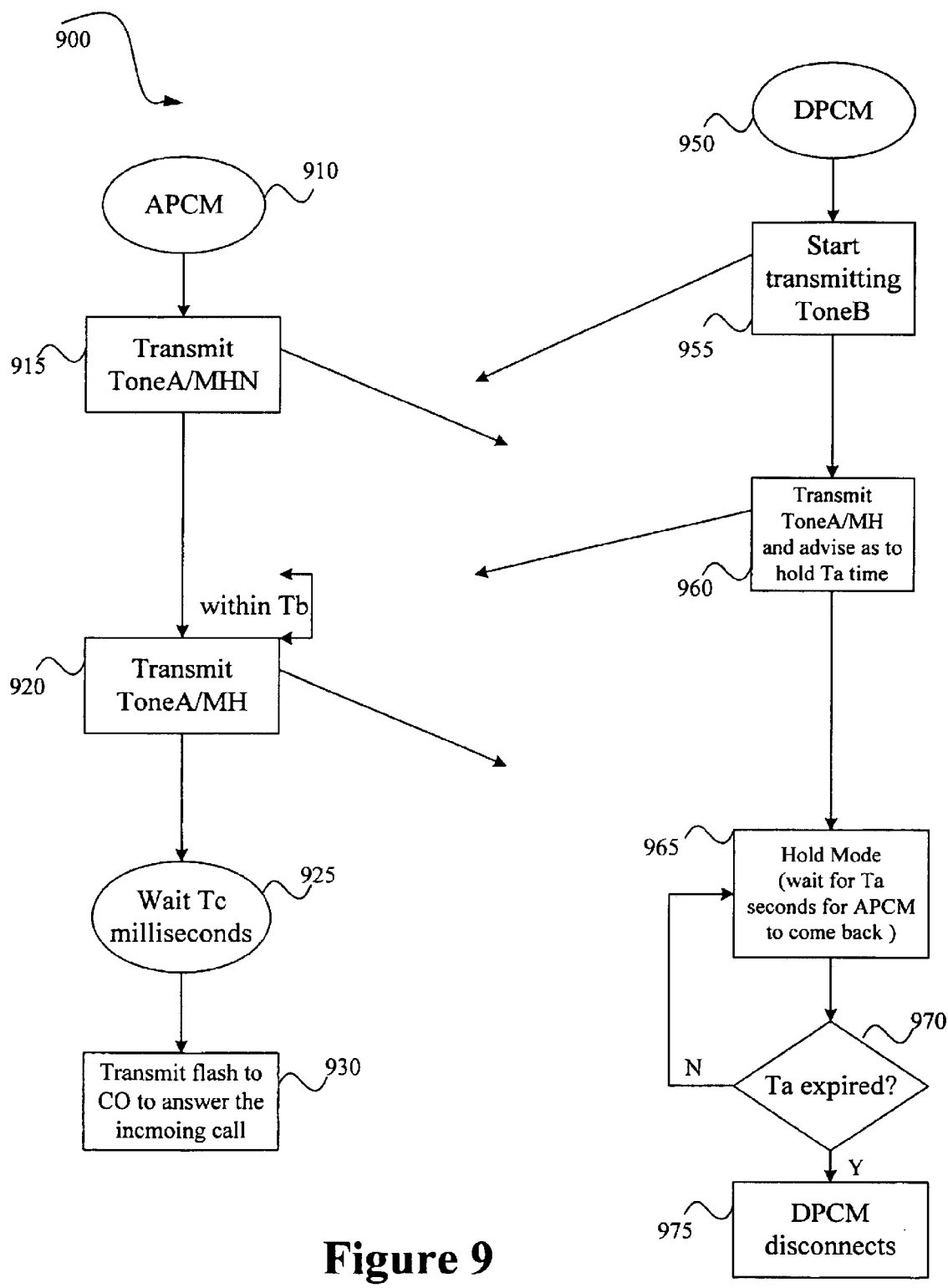
FIG. 9 is a flow diagram illustrating a modem-on-hold transaction resulting in placing a remote modem on hold according to one embodiment of the present invention.

FIG. 9 illustrates a flow diagram 900 of a modem on hold transaction resulting in placing the communication session on hold by the APCM modem. As shown, after an interruption in the communication session, DPCM process transitions from an initial state 950 to state 955 where the DPCM process starts transmitting a "B" tone to the APCM modem. At the other end of the connection, an APCM process is in its initial state 910 when it receives the "B" tone and in response transitions to state 915 where the APCM process transmits an "A" tone followed by a modem on hold notification. At the other end, at state 960, the DPCM process transmits an "A" tone followed by a modem hold signal advising the APCM modem that the DPCM may be placed on hold. As shown, the modem hold signal may include a "Ta" parameter indicating the amount of time the DPCM modem may be placed on hold. After receiving the "A" tone and the modem hold signal, the APCM process must move to state 920 within "Tb" time, e.g., 50–100 milliseconds, or otherwise the DPCM modem may terminate the modem on hold process. At state 920, the APCM process requests that the DPCM process to transition to the hold state 965. At this point, the DPCM process enters the hold state 965 and starts a timer for "Ta" period, e.g., 60 seconds. If Ta timer expires, the DPCM process terminates the communication session. At the other end, the APCM process waits for "Tc" time, 100–150 milliseconds, before transmitting a flash signal to the central office to cease the incoming call. The purpose of the "Tc" time delay is to assure that DPCM process has entered the hold state 965.

Figure 10:
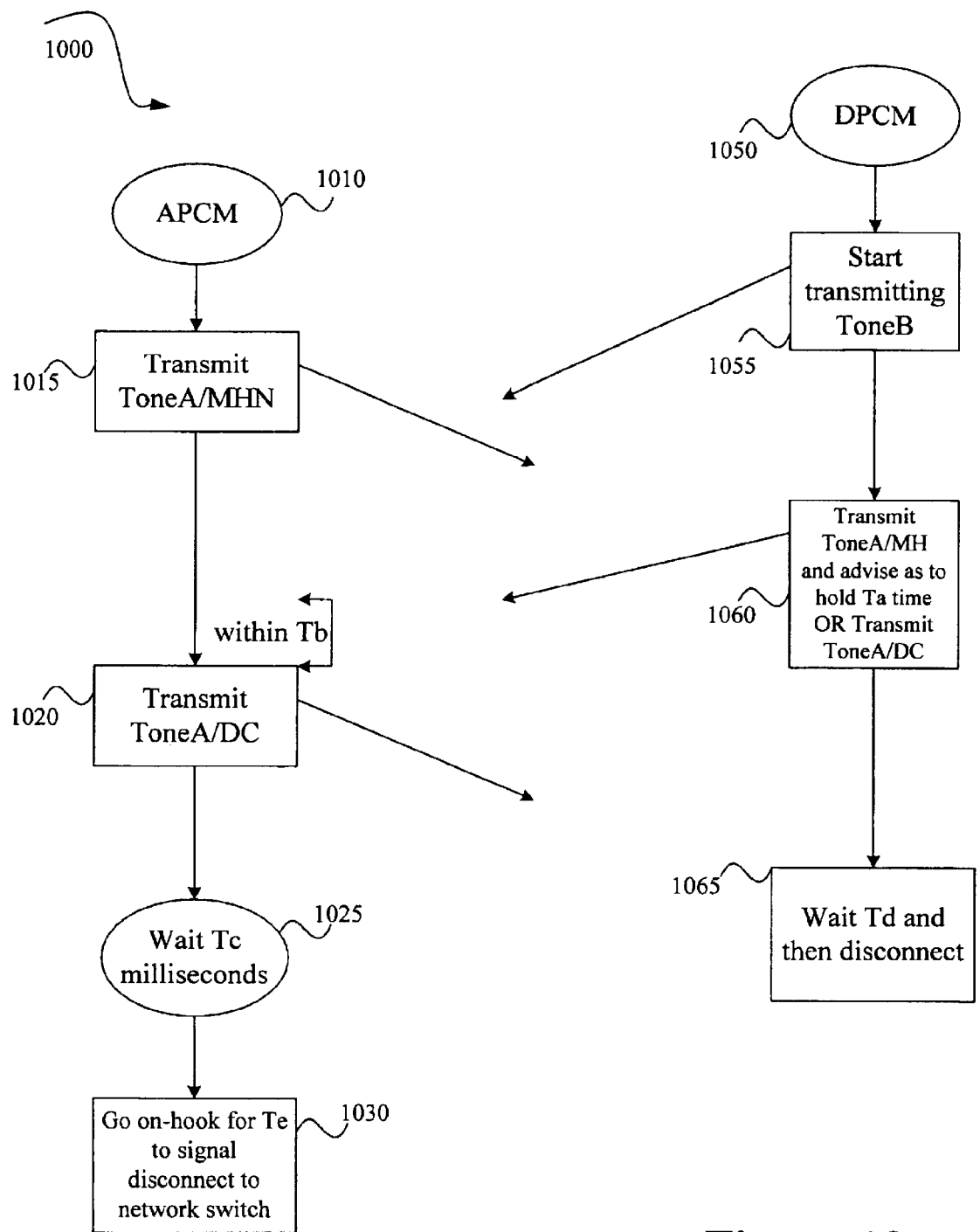
FIG. 10 is a flow diagram illustrating a modem-on-hold transaction resulting in disconnecting a remote modem according to one embodiment of the present invention.

FIG. 10 illustrates a flow diagram 1000 of a modem on hold transaction resulting in terminating the communication session by the APCM modem. Similar to the process described in conjunction with FIG. 9, after an interruption in the communication session, DPCM process transitions from an initial state 1050 to state 1055 where the DPCM process starts transmitting a "B" tone to the APCM modem. At the other end of the connection, an APCM process is in its initial state 1010 when it receives the "B" tone and in response transitions to state 1015 where the APCM process transmits an "A" tone followed by a modem on hold notification. At the other end, at state 1060, the DPCM process transmits an "A" tone followed by either a modem hold signal advising the APCM modem that the DPCM may be placed on hold or a disconnect signal advising the APCM mode that the call should be terminated if the APCM modem wishes to proceed with the modem on hold process. After receiving the "A" tone and the modem hold signal or the disconnect signal, the APCM process must move to state 1020 within "Tb" time, e.g., 50–100 milliseconds, or otherwise the DPCM modem may terminate the modem on hold process. At state 1020, the APCM process requests that the DPCM process to transition to a disconnect state 1065. At this point, the DPCM process enters the disconnect state 1065 and disconnects after "Td" time, e.g., 100–200 milliseconds. The APCM process, on the other hand, enters a "Tc" wait state 1025 where the APCM process waits "Tc" time, e.g. 100–200 milliseconds, before moving to state 1030. At state 1030, the APCM process places the APCM modem on-hook for "Te" time, e.g., about 250–300 milliseconds, or sufficient time for the digital telephone network to recognize that the APCM modem has released the communication line.

Figure 11:
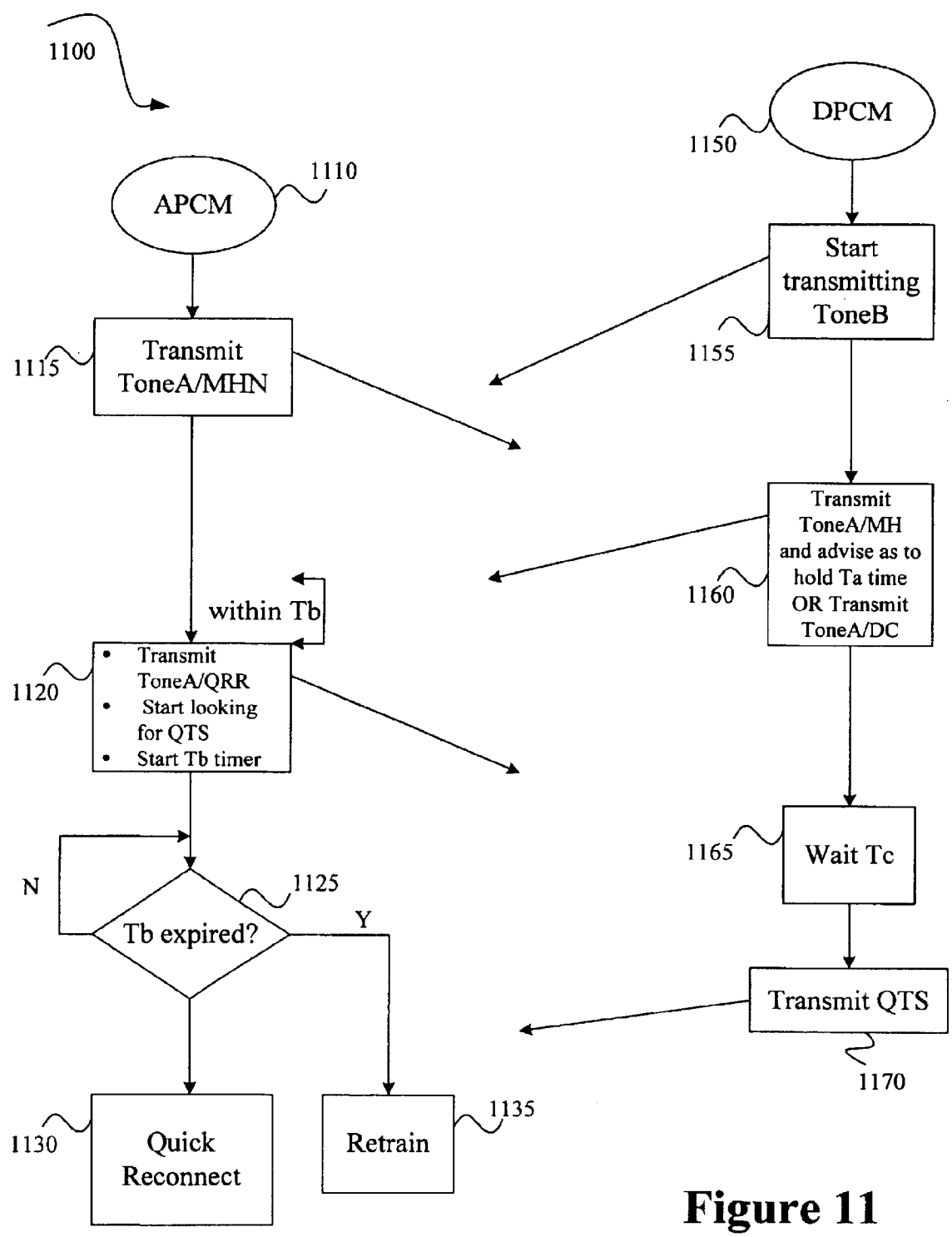
FIG. 11 is a flow diagram illustrating a modem-on-hold transaction resulting in reconnecting the modems according to one embodiment of the present invention.

FIG. 11 illustrates a flow diagram 1100 of a modem on hold transaction resulting in reviving the communication session by the APCM modem. Similar to the process described in conjunction with FIG. 10, after an interruption in the communication session, DPCM process transitions from an initial state 1150 to state 1155 where the DPCM process starts transmitting a "B" tone to the APCM modem. At the other end of the connection, an APCM process is in its initial state 1110 when it receives the "B" tone and in response transitions to state 1115 where the APCM process transmits an "A" tone followed by a modem on hold notification. At the other end, at state 1160, the DPCM process transmits an "A" tone followed by either a modem hold signal advising the APCM modem that the DPCM may be placed on hold or a disconnect signal advising the APCM mode that the call should be terminated if the APCM modem wishes to proceed with the modem on hold process. After receiving the "A" tone and the modem hold signal or the disconnect signal, the APCM process must move to state 1120 within "Tb" time, e.g., 50–100 milliseconds, or otherwise the DPCM modem may terminate the modem on hold process. At state 1120, the APCM process requests that the DPCM process to transition to a quick reconnect state 1165. At this point, the DPCM process enters the quick reconnect state 1065 and waits "Tc" time, e.g., about 50 milliseconds, before starting the reconnect process by entering state 1170 and sending a QTS signal, described above. The APCM process, on the other hand, configures the APCM modem to receive the QTS signal at step 1120. The APCM process further starts a "Tb" timer at state 1120 and transitions to state 1125. At state 1125, the APCM process waits to receive the QTS signal from the DPCM modem for "Tb" time, e.g., about 200 milliseconds. If the QTS signal is received before the expiration of the "Tb" timer, the APCM process continues with the quick reconnect procedure in state 30, as described in the above-incorporated related applications. On the other hand, if the "Tb" timer expires before the QTS signal is detected, the APCM modem may initiate a conventional retrain procedure.

Various embodiments of the present invention may be implemented in software. When implemented in software, at least some elements of the present invention can be in the form of computer data, including, but not limited to, any bits of information, code, etc. The data may be arranged in group of bits or data segments and may be stored in a processor readable medium or transmitted by a data signal embodied in a carrier wave over a transmission medium or communication link. For example, bits of information in MHN or MH may form various data segments that can be transmitted by a data signal embodied in a carrier wave. The communication link may include, but is not limited to, a telephone line, a modem connection, an Internet connection, an Integrated Services Digital Network ("ISDN")connection, an Asynchronous Transfer Mode (ATM) connection, a frame relay connection, an Ethernet connection, a coaxial connection, a fiber optic connection, satellite connections (e.g. Digital Satellite Services, etc.), wireless connections, radio frequency (RF) links, electromagnetic links, two way paging connections, etc., and combinations thereof. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. A method for use by a first modem while in a communication with a second modem via a communication network, said method comprising the steps of:
   receiving a call waiting tone by said first modem from said communication network;
   receiving a first single tone from said second modem as a result of an interruption in said communication caused by said call waiting tone;
   transmitting, during said step of receiving said first single tone, a second single tone followed by a hold notification bit pattern to said second modem in response to said interruption;
   receiving a hold refusal bit pattern from said second modem in response to said hold notification bit pattern; and
   sending a disconnect bit pattern to said second modem in response to said hold refusal bit pattern.

2. The method of claim 1, wherein each of said hold notification bit pattern and said disconnect bit pattern includes four bits, and wherein said four bits distinguish said hold notification bit pattern from said disconnect bit pattern.

3. The method of claim 1, wherein said hold refusal bit pattern informs said first modem that said second modem would disconnect if said first modem places said communication on hold.

4. The method of claim 1 further comprising the step of receiving caller ID data, wherein said transmitting step is performed prior to said step of receiving said caller ID data.

5. The method of claim 4, wherein said transmitting step overlaps with said step of receiving said caller ID data.

6. The method of claim 4, wherein a portion of said transmitting step overlaps with said step of receiving said caller ID data.

7. The method of claim 1, wherein said first tone is tone A.

8. The method of claim 1, wherein said hold notification bit pattern is a DPSK pattern.

9. The method of claim 1, wherein said second tone is tone B.

10. The method of claim 1, wherein said disconnect bit pattern is a DPSK pattern.

11. A first modem in a communication with a second modem via a communication network, said first modem comprising:
    a receiver capable of receiving a call waiting tone from said communication network, and further capable of receiving a first single tone from said second modem as a result of an interruption in said communication caused by said call waiting tone; and
    a transmitter capable of transmitting, during said step of receiving said first single tone, a second single tone followed by a hold notification bit pattern in response to said interruption;
    wherein said receiver receives a hold refusal bit pattern from said second modem in response to said hold notification bit pattern, and said transmitter sends a disconnect bit pattern to said second modem in response to said hold refusal bit pattern.

12. The first modem of claim 11, wherein each of said hold notification bit pattern and said disconnect bit pattern includes four bits, and wherein said four bits distinguish said hold notification bit pattern from said disconnect bit pattern.

13. The first modem of claim 11, wherein said hold refusal bit pattern informs said first modem that said second modem would disconnect if said first modem places said communication on hold.

14. The first modem of claim 11, wherein said receiver receives caller ID data after transmission of said hold notification.

15. The first modem of claim 14, wherein said transmitting overlaps with receiving said caller ID data.

16. The first modem of claim 14, wherein a portion of said transmitting overlaps with receiving said caller ID data.

17. The first modem of claim 11, wherein said first tone is tone A.

18. The first modem of claim 11, wherein said hold notification bit pattern is a DPSK pattern.

19. The first modem of claim 11, wherein said second tone is tone B.

20. The first modem of claim 11, wherein said disconnect bit pattern is a DPSK pattern.

21. A computer software product for use by a first modem while in a communication with a second modem via a communication network, said computer software product comprising;

code for receiving a call waiting tone from said communication network during said communication;

code for receiving a first single tone from said second modem as a result of an interruption in said communication caused by said call waiting tone;

code for transmitting, during said step of receiving said first single tone, a second single tone followed by a hold notification bit pattern to said second modem in response to said interruption;

code for receiving a hold refusal bit pattern from said second modem in response to said hold notification bit pattern; and code for sending a disconnect bit pattern to said second modem in response to said hold refusal bit pattern.

22. The computer software product of claim 21, wherein each of said hold notification bit pattern and said disconnect bit pattern includes four bits, and wherein said four bits distinguish said hold notification bit pattern from said disconnect bit pattern.

23. The computer software product of claim 21, wherein said hold refusal bit pattern informs said first modem that said second modem would disconnect if said first modem places said communication on hold.

24. The computer software product of claim 21, further comprising code for receiving caller ID data, wherein said transmitting step is performed prior to said step of receiving said caller ID data.

25. The computer software product of claim 21, wherein said first tone A.

26. The computer software product of claim 21, wherein said second tone is tone B.

27. The computer software product of claim 21, wherein said hold notification bit pattern is a DPSK pattern.

* * * * *